United States Patent [19]

Takayama

[11] Patent Number: 4,811,130
[45] Date of Patent: Mar. 7, 1989

[54] INFORMATION SIGNAL REPRODUCING APPARATUS CAPABLE OF DETERMINING A TRACK PITCH OF A RECORD BEARING MEDIUM USING A TRACKING ERROR SIGNAL AND A SIGNAL INDICATIVE OF THE MOVING SPEED OF THE MEDIUM

[75] Inventor: Nobutoshi Takayama, Kanagawa, Japan

[73] Assignee: Canon Kabushiki Kaisha, Tokyo, Japan

[21] Appl. No.: 47,539

[22] Filed: May 4, 1987

Related U.S. Application Data

[63] Continuation of Ser. No. 750,700, Jun. 28, 1985, abandoned.

[30] Foreign Application Priority Data

Jul. 2, 1984 [JP] Japan .................................. 59-136718
Jul. 2, 1984 [JP] Japan .................................. 59-136719
Jul. 2, 1984 [JP] Japan .................................. 59-136720

[51] Int. Cl.$^4$ .................... G11B 15/467; G11B 15/087
[52] U.S. Cl. .................................... 360/73.11; 360/64; 360/70; 360/10.3
[58] Field of Search ...................... 360/9.1, 73, 75, 77, 360/10.2, 10.3, 18, 27, 69, 71, 19.1, 20, 64, 33.1; 358/310, 321, 323

[56] References Cited

U.S. PATENT DOCUMENTS

| | | | |
|---|---|---|---|
| 4,550,345 | 10/1985 | Terada et al. | 360/73 |
| 4,568,986 | 2/1986 | Furuhata et al. | 360/10.2 |
| 4,607,298 | 8/1986 | Yamashita | 360/73 |
| 4,663,673 | 5/1987 | Doutsubo | 360/73 |
| 4,691,256 | 9/1987 | Kozuki et al. | 360/73 |

FOREIGN PATENT DOCUMENTS

| | | | |
|---|---|---|---|
| 59-117745 | 7/1984 | Japan | 360/73 |
| 60-98545 | 6/1985 | Japan | 360/73 |

Primary Examiner—Raymond F. Cardillo
Assistant Examiner—Steven R. Garland
Attorney, Agent, or Firm—Toren, McGeady & Associates

[57] ABSTRACT

An apparatus for reproducing information signals recorded with a plurality of pilot signals having different frequencies on a tape-like recording medium, in which a tracking error signal is formed by using the pilot signals reproduced by the head for reproducing the information signals, and pulse signals generated in correspondence to the moving action of the recording medium during a period of variation in level of the tracking error signals are counted to discriminate whether the recording speed of the information signals and the moving speed of the recording medium are coincident or not.

12 Claims, 4 Drawing Sheets

INFORMATION SIGNAL REPRODUCING APPARATUS CAPABLE OF DETERMINING A TRACK PITCH OF A RECORD BEARING MEDIUM USING A TRACKING ERROR SIGNAL AND A SIGNAL INDICATIVE OF THE MOVING SPEED OF THE MEDIUM

This is a continuation of application Ser. No. 750,700 filed June 28, 1985, now abandoned.

BACKGROUND OF THE INVENTION

1. Field of the Invention

This invention relates to an information signal reproducing apparatus, and more particularly, to an apparatus for reproducing an information signal recorded in helical tracks on a tape-shaped record bearing medium.

2. Description of the Prior Art

The reproducing apparatus of the above-stated type is conceivable in varied kinds, including a magnetic recording and/or reproducing apparatus, an optical reproducing apparatus, etc. This specification, however, describes, by way of example, a video tape recorder (hereinafter referred to as a VTR) arranged to reproduce a video signal from a magnetic tape which has a television signal recorded thereon.

During recent years, high density recording has become possible permitting the development and the manufacture of a VTR capable of recording and reproducing over a long period of time with the pitch of helical recording tracks narrowed thereby allowing a magnetic tape to travel at a lowered speed.

Generally, each of these VTR's is arranged to permit switch-over between different operation time modes for recording and reproduction including, for example, a standard time mode, a long time mode, etc., so that the VTR can be operated also according to a conventional format. In reproducing from a magnetic tape, a signal recorded by the VTR which can be switched over between the different time modes, the magnetic tape must be played back in the same time mode that had been employed for recording. If not, the tracing locus of a reproducing head deviates from the center locus of the recording track formed on the tape resulting in a disturbed reproduced image. However, it would be very troublesome for the operator to manually switch over the reproducing time mode according to the reproduced image to avoid having such a disturbed image. The conventional solution of this problem has been as follow: A control signal (hereinafter referred to as a CTL signal) is recorded along the edge part of the magnetic tape at intervals of one frame during a recording operation. Then, during a reproducing operation, frequency generator detects the number of revolutions of a capstan motor which is proportional to the travelling distance of the magnetic tape, and produces an output (hereinafter referred to as an FG signal); any difference between the reproducing time mode and the recording time mode is detected by counting how many pulses of the FG signal are produced during one interval of the CTL signal, the reproducing time mode being thus automatically changed, accordingly. The details of an example of the conventional arrangement are as described below with reference to FIG. 1 of the accompanying drawings:

FIG. 1 shows the method for counting the pulses of the FG signal which represents the number of revolutions of a capstan motor in relation to the CTL signal.

The illustration includes a magnetic tape 1 which is arranged to travel in the direction of an arrow by a capstan 2 and a pinch roller 3. A rotary magnetic head (not shown), which is mounted on a rotating drum as is well known, reproduces from the magnetic tape 1 a video signal which is recorded in helical tracks on the magnetic tape 1 in the longitudinal direction thereof. The capstan 2 is rotated at a predetermined speed by a capstan motor 4 through a belt 5. A frequency generator 6 detects the number of revolutions of the capstan motor 4. The number of pulses produced from this frequency generator 6 is in proportion to the travelling distance of the magnetic tape 1. The pulse signal of the generator 6 is supplied to a clock input terminal CK of a counter 8 via an amplifier 7. A control head 9 is arranged to reproduce the CTL signal which is recorded for every frame on the tape 1. The reproduced CTL signal is supplied, via an amplifier 10 and a waveform shaper 11, to the reset terminal R of the above-stated counter 8. Upon receipt of these inputs, the counter 8 counts the number of revolutions of the capstan motor 4 made during a period between one occurrence of reproduction of the reproduced CTL signal and another. The outputs Q1–Q4 of the counter 8 are supplied to a magnitude comparator 13. The comparator 13 is arranged to compare the output of the counter 13 with a reference value set and produced from a reference setter 12. The output Q5 of the comparator 13 is produced at a high level when the output of the counter 8 is either higher or lower than the reference value. Assuming that the number of pulses received by the counter 8 during one interval period of the CTL signal is 44 in case that recording has been performed in the standard time mode, the tape feeding speed is reduced to half in the event of recording in a long time mode which is twice as long as the standard time mode and the CTL signal interval period becomes ½ of the interval period obtained for recording in the standard time mode. Accordingly, when the magnetic tape which has been recorded in the long time mode is reproduced in the standard time mode, the counter receives during the CTL signal interval period only 22 pulses which are one half of 44. Therefore, the reference value of the reference setter 12 is preset at a value between 22 and 44. Then, the signal to be reproduced can be considered to have been recorded in the long time mode when the number of pulses counted by the counter 8 is less than the set reference value with reproduction made in the standard time mode; and to have been recorded in the standard time mode when the counted number of pulses is more than the set reference value.

However, there are some instances where no CTL signal is provided for indicating the pitch of the tracks on the tape-shaped record bearing medium, or where the CTL signal has dropped out of the medium. In that event, the track pitch cannot be found by the above-stated arrangement. The automatic mode switching operation described in the foregoing has been impossible, for example, for an apparatus of the kind arranged to perform tracking in accordance with a 4-f pilot method which has recently been proposed as will be described later herein.

SUMMARY OF THE INVENTION

This invention is directed to the solution of the above-stated problem of the prior art arrangement. It is therefore an object of this invention to provide an information signal reproducing apparatus which is capable of detecting a track pitch in performing a reproducing operation even in the event of absence of a signal indicating the track pitch on a tape-shaped record bearing medium.

It is another object of this invention to provide an information signal reproducing apparatus which is capable of detecting a track pitch even when a tape-shaped record bearing medium is allowed to travel at any speed for reproduction.

Under this object, an information signal reproducing apparatus arranged as a preferred embodiment of this invention for reproducing information signals recorded in helical tracks on a tape-shaped recording medium comprises: a reproducing head arranged to trace the recording medium in an oblique direction relative to the medium, moving means for moving the recording medium in the longitudinal direction thereof, means for forming a tracking error signal by using a signal produced from the reproducing head, and means for detecting the moving distance of the recording medium relative to the period of variation of the tracking error signal.

It is a further object of this invention to provide an information signal reproducing apparatus which is capable of detecting a track pitch with a high degree of reliability by using a signal produced from a reproducing head arranged to obliquely trace a tape-shaped recording medium.

Under that object, an information signal reproducing apparatus arranged as another preferred embodiment of this invention for reproducing information signals recorded in helical tracks on a tape-shaped recording medium comprises: a reproducing head arranged to obliquely trace the recording medium, moving means for moving the recording medium in the longitudinal direction thereof, means for forming a tracking error signal by using a signal produced from the reproducing head, means for detecting the period of variation of the tracking error signal, means for detecting the pitch of the oblique tracks of the recording medium on the basis of the variation period, and control means for controlling the speed of moving the recording medium by the moving means in accordance with a predetermined plurality of number of times for which the detecting action of the track pitch detecting means is repeated.

These and further objects and features of this invention will become apparent from the following detailed description of a preferred embodiment thereof taken in connection with the accompanying drawings.

DETAILED DESCRIPTION OF THE PREFERRED EMBODIMENTS

Figure 1:
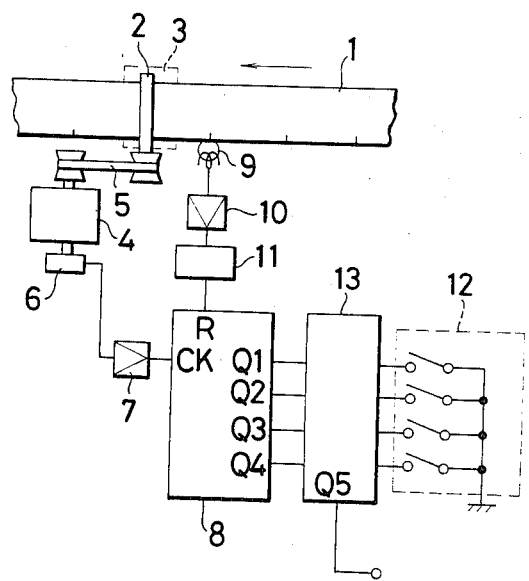
FIG. 1 is a circuit diagram showing a tape travel error detecting circuit arranged in the conventional apparatus.
Figures 2A, 2B:
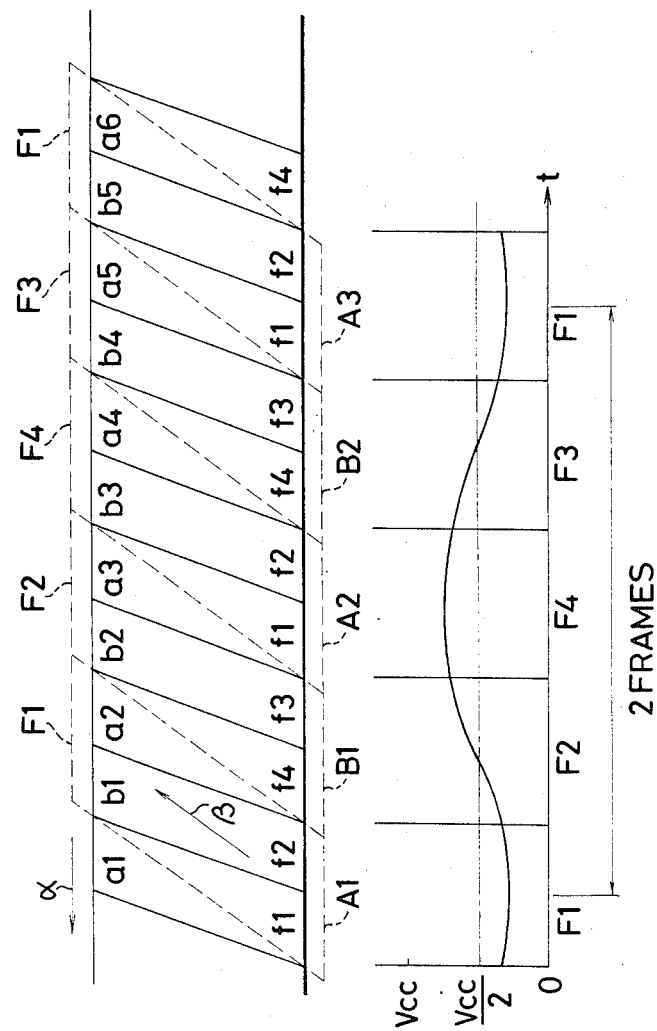
FIGS. 2A, 2B, 3A and 3B are illustrations of the operating principle of an embodiment of this invention.

The operating principle of an embodiment of this invention is as shown in FIGS. 2A, 2B, 3A and 3B. FIG. 2A shows recording tracks on a magnetic tape. Recording tracks a1, a2, - - - are recorded by a recording head of the plus azimuth type and tracks b1, b2, - - - by a recording head of the minus azimuth type. An information signal has been recorded in a long time mode forming the tracks in the manner of a1—b1—a2—b2—a3—b3, - - - . Meanwhile, a pilot signal of a frequency f1 is superimposed on the tracks a1, a3, a5, - - - while a pilot signal of a frequency f2 is superimposed on the tracks b1, b3, b5, - - - . Assuming that frequencies f1, f2, f3 and f4 are in a relation of f1<f2<f3<f4, there obtains the following relation: f2−f1=f4−f3=f5, f4−f2=f3−f1=f6, f5≠f6. When the tracks having the pilot signals of frequencies f1, f2, f3 and f4 are reproduced, the pilot signal which is recorded in a track adjoining each of these tracks is also reproduced as a crosstalk component. Then, with signals F1, F2, F3 and F4, which are of the same frequencies as those of the pilot signals recorded in the tracks to be reproduced, used to multiply a reproduction output by them, signals of frequencies f5 and f6 are obtained as the crosstalk components. The levels of these signals are then compared with each other to obtain a tracking error signal (hereinafter referred to as the ATF signal). While the above-represents an example of the method for obtaining the ATF signal, the frequencies to be superimposed on the video signal are conceivable in varied kinds of combinations.

In case that the tracks which have been recorded in this manner are to be reproduced at a travelling speed (a standard time mode) which is higher than the travelling speed (a long time mode) at which they have been recorded, the embodiment of this invention operates in the following manner: In FIG. 2A, broken lines indicate the loci of the head obtained during the reproducing operation. An arrow α indicates the direction in which the tape travels while another arrow β indicates the scanning direction of the head. The tape travelling speed in the long time mode is arranged to be ½ of the standard time mode. The head width of the reproducing head is arranged to be equal to the width of the track which has been recorded in the standard time mode. When the tape is traced at the tape speed of the standard time mode under this condition, the inclination of the locus of the reproducing head does not coincide with that of the track pattern formed on the tape. Besides, the reproduced pilot signals f1–f4 obtained from the pilot signals recorded in the tracks reproduced do not come to correlate to the frequency signals F1–F4 which are to be mixed at the time of reproduction. As a result, the ATF signal varies in a cycle of two frames. Assuming that the reproducing head scans a field B2 in the case of FIG. 2A, the frequency signal to be used for multiplying the reproduction output during scanning over the field B2 is F3. The phase of the capstan then should be controlled by the ATF signal in such a way as to have the track b4, which is the nearest field to the field B2, reproduced among the tracks including the pilot signal f3 having the same frequency as the signal F3. Whereas, the inclination of the track differs from that of the locus of the reproducing head as mentioned above. Therefore, a satisfactory tracking condition can be attained solely at the middle point of the field B2. Meanwhile, the pilot signal of the frequency f4 recorded in one adjoining track a4 comes to be conspicuously reproduced at an initial scanning point. Then, at a final scanning point, the pilot signal of the frequency f1 recorded in the other adjoining track a5 comes to be conspicuously reproduced. To solve this problem, the level of the ATF signal is arranged to become high to quicken the tape feeding speed at the beginning point of the field B2 and to become low to slow down the tape feeding speed at the ending point of the field B2.

Assuming that a satisfactory tracking condition is normally obtained with the voltage of the ATF signal at Vcc/2, the ATF signal shows a vibration waveform of a period of 2 frames having the voltage value Vcc/2 in the middle thereof.

Figures 3A, 3B:
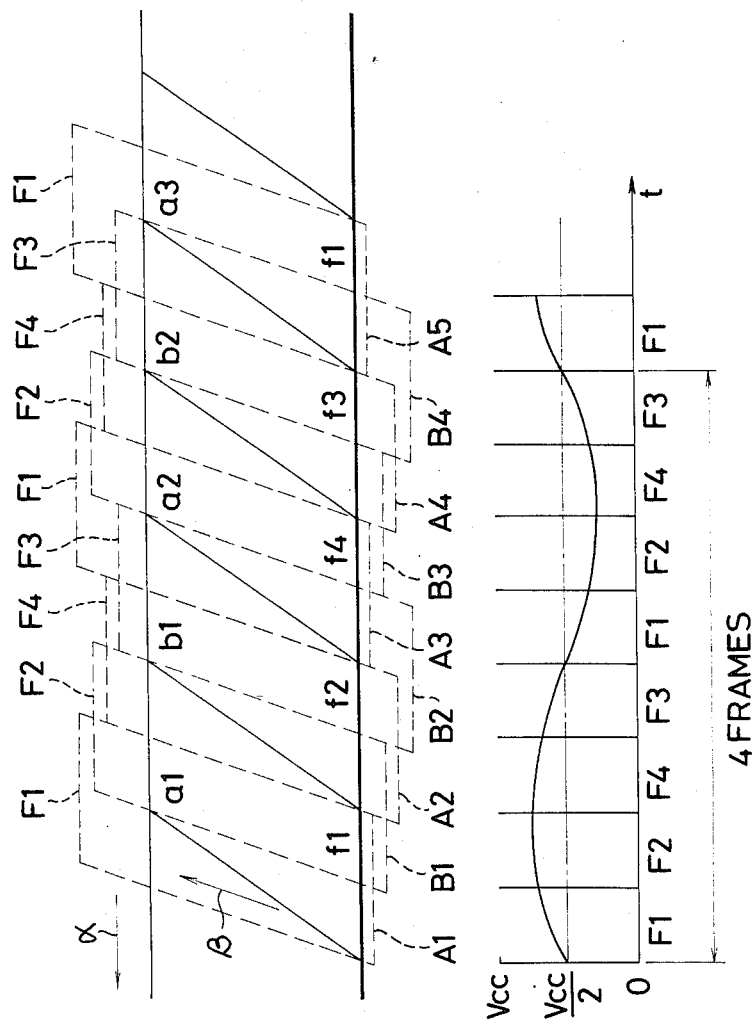

FIGS. 3A and 3B show a mistracking condition which takes place when an information signal which has been recorded in the standard time mode, is played back in the long time mode. In this case, unlike the case of FIGS. 2A and 2B, a mistracking condition repeatedly takes place at regular intervals of 4 frames. Accordingly, the ATF signal varies at the period of 4 frames as shown in FIG. 3B.

As apparent from the foregoing description, the ATF signal periodically varies in cases where the information signal is reproduced at a tape feeding speed which differs from a tape feeding speed employed for recording. In other words, the reproducing time mode can be regarded as differing from the recording time mode either in cases where the ATF signal varies in a cycle of 2 frames during a reproducing operation or where it varies in a cycle of 4 frames during a reproducing operation. Further, even in the case of a wrong reproducing time mode, the length of a tape portion, which travels during each variation cycle of the ATF signal occurred under that condition, remains unvaried. In view of this fact, the pulses of the FG signal, which represents the number of revolutions of the capstan motor and produced during one cycle, or period, of the variation of the ATF signal, are arranged to be counted. Then, the reproducing time mode is arranged to be switched over from one mode to another as required when the count value thus obtained comes to coincide with a predetermined number (a number of pulses of the FG signal produced during the process of recording one frame portion of a video signal in the standard time mode). This arrangement permits the reproducing time mode to be automatically shifted to coincide with the tape feeding speed employed at the time of recording.

Figure 4:
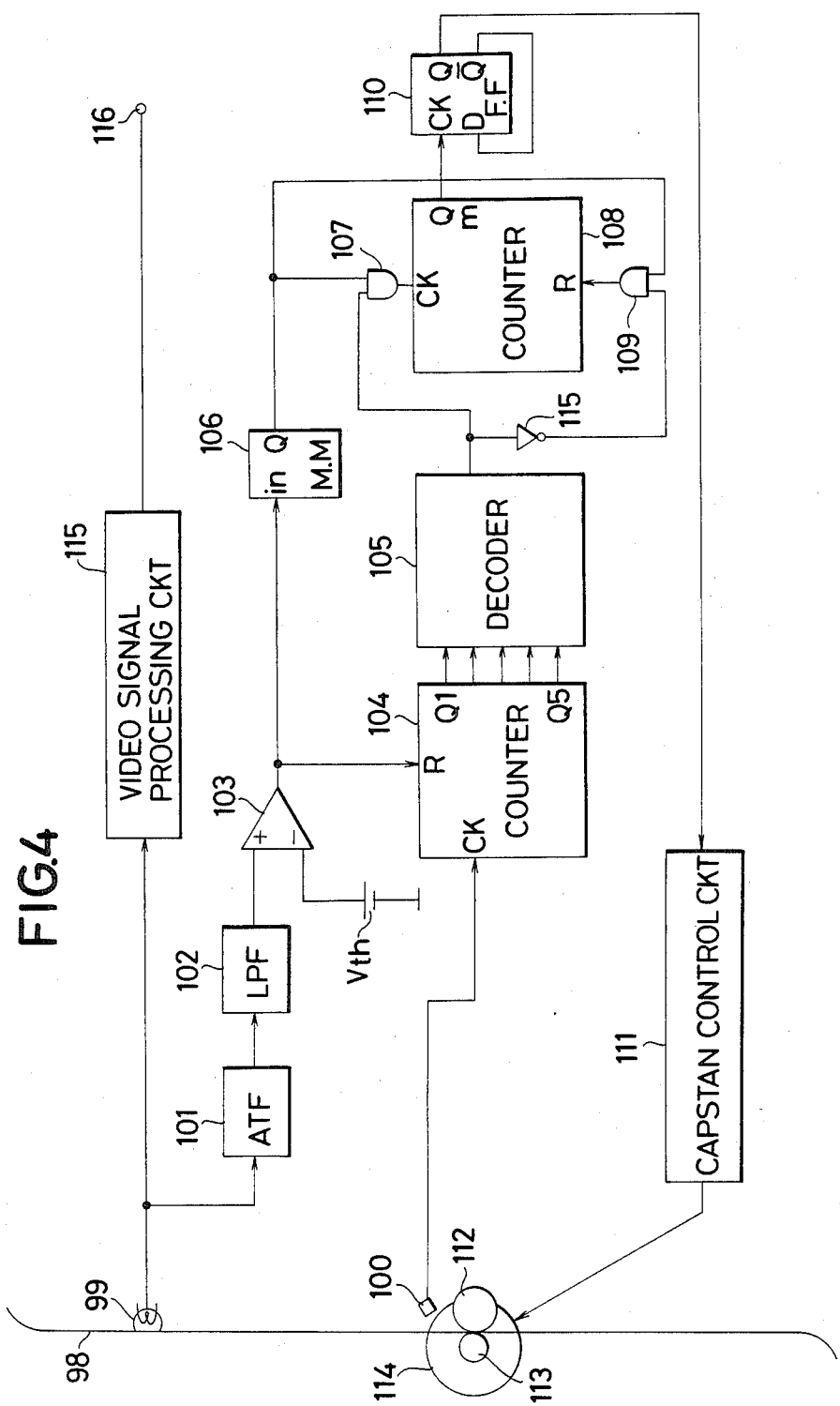
FIG. 4 is a block diagram showing the arrangement of an information signal reproducing apparatus embodying this invention.

FIG. 4 is a block diagram showing the arrangement of a reproducing apparatus embodying the concept of this invention described in the foregoing. The illustration includes a magnetic tape 98; a reproducing head 99 which is arranged to trace the tape 98; and an ATF circuit 101 which is arranged to produce the ATF signal by using a signal produced from the head 99. The details of the ATF circuit 101 is well known and are, therefore, omitted from description herein. The output of the head 99 is supplied to a video signal processing circuit 115. A reproduced video signal is arranged to be produced from a terminal 116. A low-pass filter 102 (hereinafter referred to as LPF) is arranged to remove from the ATF signal, a high frequency component such as a noise or the like. A comparator 103 is arranged to compare a signal produced from the LPF 102 with a predetermined voltage Vth. A counter 104 is arranged to count, while the signal produced from the comparator 103 is at a low level (hereinafter referred to as L), the pulses of an FG signal having a frequency relative to the rotating speed of a fly-wheel 114 of a capstan 113 detected by a detector 100 during the L period of the output signal of the comparator 103. A decoder 105 is arranged to determine the counted value of the counter 104. A monostable multivibrator 106 is arranged to produce a single pulse in synchronism with the rise of the signal produced from the comparator 103. An AND gate 107 is arranged to supply the logical product of the output of the decoder 105 and the signal produced from the monostable multivibrator 106. Another counter 108 is arranged to count the output of the AND gate 107. An AND gate 109 is arranged to supply the logical product of the output of an inverter 115 and that of the monostable multivibrator 106. A flip-flop 110 is arranged to be inverted by the rising edge of the output of the counter 108. A capstan control circuit 111 is arranged to control the rotation of the capstan 113 on the basis of the output of the flip-flop 110. A pinch roller 112 is arranged to be in pressed contact with the capstan 113.

The operation of the embodiment is as follows: As mentioned in the foregoing, the embodiment is arranged to detect the time mode by counting the number of pulses of the FG signal produced during one variation period of the ATF signal which periodically varies. In the case of this specific embodiment, since the ATF signal is assumed to vary with the value Vth in the middle of the signal, the ATF signal is compared with the value Vth by the comparator 103. The number of pulses of the FG signal produced while the level of the ATF signal is lower than the value Vth are counted. Assuming that the frequency of the FG signal produced in the standard time mode is 720 Hz, a total of 24 pulses are produced during one frame period (1/30 sec.). Therefore, in case that the counter 104 counts 24 pulses while the output level of the comparator 103 is at L, it can be known that the travelling speed of the recording medium at the time of recording differs from the travelling speed of the medium travelling for reproduction.

Generally, however, the recording level of the ATF signal is extremely low as mentioned in the foregoing. Therefore, the output of the comparator 103 does not always remain at L exactly for a period of 1/30 sec. in the standard reproducing time mode and exactly for a period of 1/15 sec. in the long reproducing time mode. In view of such probability, some allowable range is set for each of these modes. If the time during which the output of the comparator 103 remains L is within the set allowable range, the reproducing operation is considered to be being performed at a tape travelling speed different from the speed employed for recording. Therefore, the decoder 105 is arrangd to produce an output at a high level (hereinafter referred to as H) when the counted value N of the counter 104 is $24-\alpha < N < 24+\alpha$ and at L when the counted value is either $N < 24-\alpha$ or $24+\alpha < N$. Here, the value $\alpha$ indicates the set allowable range. Such being the arrangement, the output level of the decoder 105 is H when the number of pulses of the FG signal produced while the ATF signal is at a value lower than the value Vth is within the range from $(24-\alpha)$ to $(24+\alpha)$. If the number of pulses is outside of this range, the output level of the inverter 115 becomes H.

When the output level of the comparator 103 changes to H, a single pulse is produced in synchronism with this from the Q output terminal of the monostable multivibrator 106. Either the AND gate 107 or 109 produces a single pulse, which then either causes the counter 108 to count up or resets it. In short, the counter 108 is caused to count up when the record is reproduced at a tape speed different from a recording tape speed. Theoretically, the time mode can be switched by one performance of detection. However, even where reproduction is normally performed, the level of the ATF signal might happen to become lower than the value Vth for a period of one or two fields. In that event, the mode switching operation would be wastefully carried out. In this embodiment, the occurrence of such is prevented as follows: The level of the Q output of the counter 108 changes to H to effect switch-over of the reproducing time mode by inverting the Q output of the flip-flop 110 only in the event that the mode error detection pulse which is the output of the AND gate 107 is produced consecutively an "m" number of times.

Since the VTR according to this invention is arranged as described in the foregoing, the reproducing time mode can be automatically switched over to the tape travelling speed used for recording by detecting the distance to which the tape travels during the varying period of the ATF signal, so that the automatic switching of the reproducing time mode can be adequately carried out even in the absence of the control signal of the kind called the CTL signal.

The track pitch is detected on the basis of the above-stated travelling distance detected. The tape travelling speed is switched over from one speed to another when the reproducing track pitch has been repeatedly found to differ from the recorded track pitch a predetermined consecutive number of times. Therefore, the tape travel speed can be switched with an extremely high degree of reliability.

Further, in accordance with this invention, the arrangement to detect whether the number of pulses of the FG signal produced within the period of variation of the ATF signal is within a predetermined range ensures prompt and yet accurate switch-over of the reproducing tape travel speed to the same speed as the tape speed employed for recording.

In the embodiment given above, the tape travel speed employed for recording is described to be one of two different speeds. However, the time mode selection error is likewise detectable even in the event of three or more different recording tape travel speeds, instead of two, by adjusting the counted value to be detected by the decoder 105 accordingly. Further, the time mode error detecting arrangement is applicable not only for ordinary reproduction but also for other special reproducing operations of a VTR called a search reproduction and slow reproduction by suitably changing the condition of the decoder.

While the detection output has been described as to be used for switching tape travel speed, it of course can be utilized for switch-over between different reproducing heads in the event of a VTR of the kind arranged to use a different head for a different mode of reproducing operation. Further, the invention is not limited to the circuit arrangement of the specific embodiment described. In accordance with the invention, it is of course possible to use a known analog circuit arrangement.

What is claimed is:

1. An information signal reproducing apparatus for reproducing information signals recorded on a tape-shaped recording medium with a plurality of pilot signals of different frequencies, comprising:
   (a) a reproducing head arranged to trace said recording medium for reproducing the information signals and the pilot signals;
   (b) moving means for moving said recording medium in a longitudinal direction thereof;
   (c) forming means for forming a tracking error signal by using the pilot signals reproduced by said reproducing head;
   (d) first generating means for generating a pulse signal having a frequency corresponding to a moving speed of the recording medium by detecting a recording medium moving action of said moving means;
   (e) second generating means for generating a cyclic signal having a cycle corresponding to a cycle of the track error signal;
   (f) counting means for counting the pulse signal generated by said first generating means for a period determined according to the cycle of said cyclic signal; and
   (g) discriminating means for discriminating whether or not a recording medium moving speed of said moving means is coincident with a recording speed of the information signals recorded on said recording medium, said discriminating means including a first discriminating means for discriminating whether or not a counted output of said counting means is within a predetermined range of values at every cycle of said cyclic signal.

2. An apparatus according to claim 1, further comprising changing means for changing the recording medium moving speed of said moving means in response to an output of said discriminating means.

3. An apparatus according to claim 2, wherein said changing means is arranged to change the recording medium moving speed of said moving means in response to a predetermined number of continuous outputs of said discriminating means all of which indicate that the recording medium moving speed is not coincident with the recording speed of the information signals.

4. An apparatus according to claim 1, wherein said discriminating means further includes second discriminating means for discriminating that a predetermined number of continuous outputs of said first discriminating means all of which indicate that the counted output of said counting means is within said predetermined range of values.

5. An apparatus according to claim 1, wherein said recording medium is a magnetic tape, and said moving means includes a capstan for transporting the magnetic tape in the longitudinal direction thereof.

6. An apparatus according to claim 5, wherein said first generating means includes a detector for detecting a rotating speed of the capstan to generate the pulse signal.

7. An apparatus according to claim 5, wherein said reproducing head includes a rotary head.

8. An information signal reproducing apparatus for reproducing information signals from recording tracks formed on a tape-shaped recording medium one after another with a plurality of kinds of pilot signals repeatedly superimposed on the information signals, comprising:
   (a) a reproducing head arranged to trace said recording medium for reproducing the information signals along with the pilot signals;
   (b) moving means for moving said recording medium in a longitudinal direction thereof;
   (c) forming means for forming a tracking error signal by using the pilot signals reproduced by said reproducing head;
   (d) first generating means for generating a pulse signal having a frequency corresponding to a moving speed of the recording medium by detecting a recording medium moving action of said moving means;

(e) second generating means for generating a cyclic signal having a cycle corresponding to a cycle of the track error signal;

(f) counting means for counting the pulse signal generated by said first generating means for a period determined according to the cycle of said cyclic signal; and (g) discriminating means for discriminating a pitch of said recording tracks, said discriminating means including a first discriminating means for discriminating whether or not a counted output of said counting means is within a predetermined range of values at every cycle of said cyclic signal.

9. An apparatus according to claim 8, further comprising changing means for changing the recording medium moving speed of said moving means in response to an output of said discriminating means.

10. An apparatus according to claim 8, wherein said discriminating means further includes second discriminating means for discriminating that a predetermined number of continuous outputs of said first discriminating means all of which indicate that the counted output of said counting means is within said predetermined range of values.

11. An apparatus according to claim 8, wherein said recording medium is a magnetic tape, and said moving means includes a capstan for transporting the magnetic tape in the longitudinal direction thereof.

12. An apparatus according to claim 11, wherein said first generating means includes a detector for detecting a rotating speed of the capstan to generate the pulse signal.

* * * * *